Figure 1:
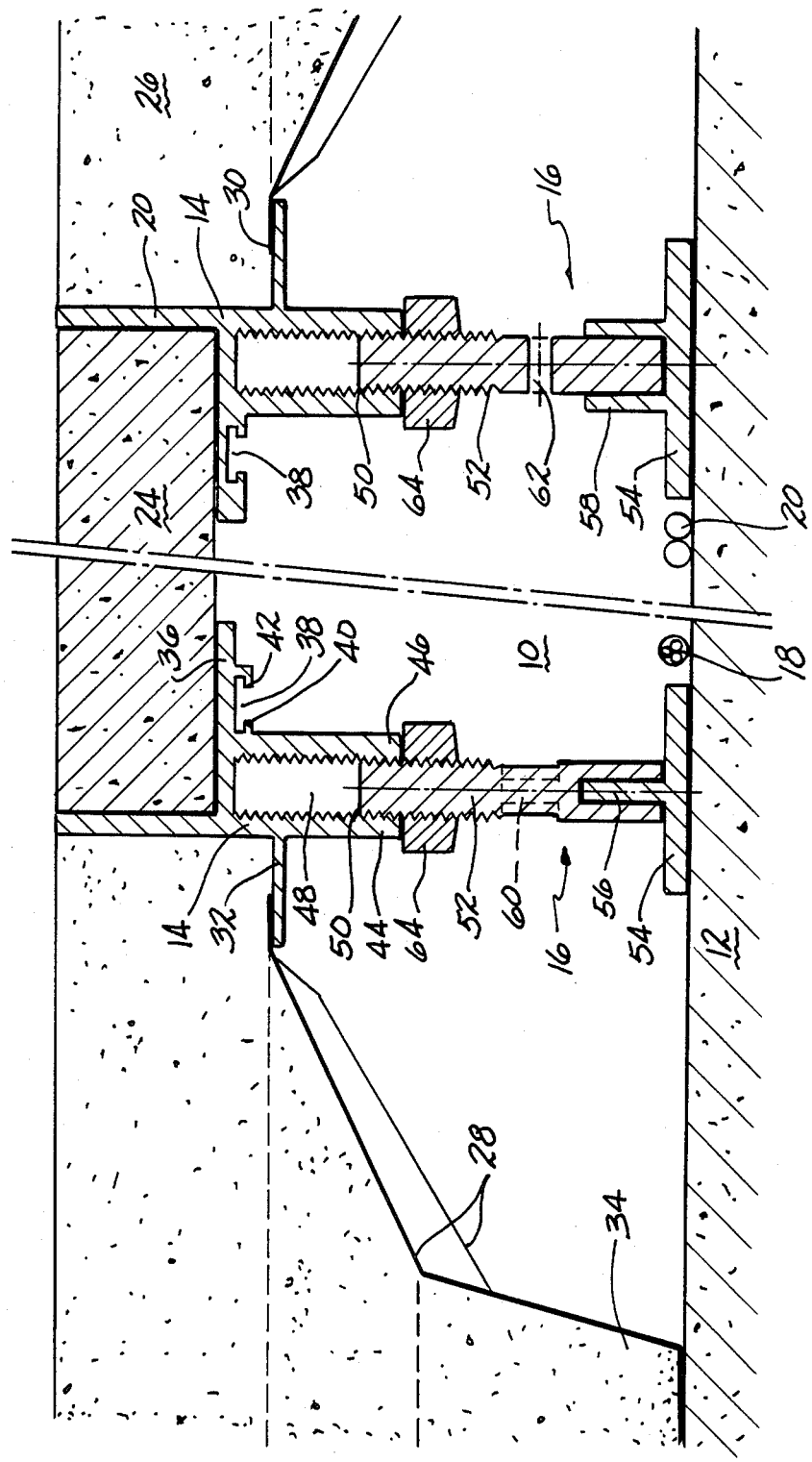

United States Patent [19]

Röllin et al.

[11] Patent Number: 4,683,690

[45] Date of Patent: Aug. 4, 1987

[54] SUPPORT DEVICE AND WALL FOR A CABLE DUCT IN A CAVITY LINING FLOOR

[75] Inventors: Carl Röllin; Hanspeter Rüfenacht, both of Hausen, Switzerland

[73] Assignee: BTA Boden-Technik AG, Zurich, Switzerland

[21] Appl. No.: 909,679

[22] Filed: Sep. 22, 1986

[30] Foreign Application Priority Data

Aug. 9, 1986 [CH] Switzerland .................. 3217/86

[51] Int. Cl.$^4$ .................................................. E04B 5/48
[52] U.S. Cl. ..................................... 52/126.2; 52/220; 52/221
[58] Field of Search ....................... 52/126.2, 220, 221

[56] References Cited

U.S. PATENT DOCUMENTS

| | | | |
|---|---|---|---|
| 2,544,981 | 3/1951 | Buell | 52/220 X |
| 2,808,136 | 10/1957 | Hammitt et al. | 52/220 X |
| 3,368,311 | 2/1968 | Fork | 52/221 X |
| 3,394,509 | 7/1968 | McKinley | 52/221 |
| 3,420,017 | 1/1969 | Brugger et al. | 52/221 |
| 3,593,472 | 7/1971 | Bargar | 52/221 |
| 3,844,440 | 10/1974 | Hadfield et al. | 52/221 X |

FOREIGN PATENT DOCUMENTS

| | | | |
|---|---|---|---|
| 2644711 | 12/1977 | Fed. Rep. of Germany | 52/220 |
| 3103632 | 8/1982 | Fed. Rep. of Germany | |

*Primary Examiner*—Alfred C. Perham
*Attorney, Agent, or Firm*—Bachman & LaPointe

[57] ABSTRACT

A support device and wall for a cable duct (10) in a cavity lining floor comprises a lift-off double bottom (24) in the direction of the cable duct (10) and a prefabricated blind shuttering (28) on the opposite side. Legs (16), which stand upon the bare concrete floor (12) at regular intervals corresponding to an integral multiple of the interval (e) of adjacent depressions (34) in the blind shuttering (28), are in alignment with the depressions (34) relative to the transverse direction of the cable duct (10).

The legs are constructed as support plates (54) with vertical support rod (52) which exhibits a screw-thread at least in the uppermost region. A support profile (14) is arranged on these legs (16) with a cantilevered profile tab (32, 36) on each side as a horizontal bearing surface for the edge (30) of the blind shuttering (28) or the double bottom (24) respectively, with a profile tab (32) projecting vertically upwards and separating the double bottom (24) and the cast-in mass (26) and with a groove (48) of square or rectangular cross-section open downwards. The two side faces of this groove (48) have continuously recessed longitudinal groovings (50) which correspond to the screwthread of the support rods (52) and are mutually vertically staggered by half the pitch of the screwthread.

The screwthread of the support rods (52) is engaged in the longitudinal groovings (50) of the groove (48).

10 Claims, 3 Drawing Figures

SUPPORT DEVICE AND WALL FOR A CABLE DUCT IN A CAVITY LINING FLOOR

The invention relates to a support device and wall for a cable duct in a cavity lining floor, which device comprises a lift-off double bottom in the direction of the cable duct and a prefabricated blind shuttering on the opposite side and exhibits legs standing on the bare concrete floor at regular intervals corresponding to an integral multiple of the interval of adjacent depressions in the blind shuttering, which legs are in alignment with the depressions relative to the transverse direction of the cable duct.

Prefabricated blind shutterings and their use are described in WO-A1 No. 86/02120 and German Offenlegungsschrift No. 3,103,632, for example. A load-bearing flexible support foil with joint zones or overlap zones has depressions shaped downwards on one side arranged at regular intervals in the longitudinal and transverse directions, which form vault-like cavities with the foundation. These depressions, which close fluid-tightly, are suitable to receive a flowable self-hardening mass. According to WO-A1 No. 86/02120 the depressions have square or rectangular horizontal sections on each level and a horizontally encircling bend in the upper region, which separates the flatter upper and the steeper lower side walls. Reinforcing beads, which are constructed in the region of the four side edges of the upper frustopyramid, terminate in the side edges of the lower frustopyramid. The support foil is used in civil engineering, for example as a shaping shuttering for cavity lining floors hardening in situ. The vault-like cavities in the lining floor are well suited for drawing through electric cables etc., at least cables and lines necessary for the infrastructure of the building.

For main lines, which lead from one room to another or along corridors for example, cable ducts are still recessed. Branches extend from these cable ducts, particularly, electrical, telephone and EDP installations to plug-in, loop and branch box fittings, which can be installed at any time and in any position. The individual appliances are fed with electrical power from these boxes.

In the region of cable ducts the cavity lining floor, which has depressions supported on the concrete floor at a regular interval of 200 mm in two directions, for example, is interrupted to a width of generally 300–600 mm. The cavity lining floor, which is applied in flowable state, must be demarcated with a wall. Simultaneously, the terminal edge of the blind shuttering must also be supported. The cable duct is generally masked by a double bottom formed by lift-off square slabs.

Bare concrete floors exhibit considerable irregularities, which may amount to several millimeters up to approximately one centimeter. This is unimportant in the case of cavity lining floors applied in liquid state, because the applied mass is self-leveling. On the other hand, the support devices and walls acting as closure means for cable ducts must be capable of adjustment. In current practice complicated screw devices are used for this purpose, which generally rest upon legs which are likewise vertically adjustable by screw systems.

The inventors adopted the aim to produce a support device and wall of the type discussed above, which can be produced simply and operated inexpensively. It should be possible to achieve a considerable reduction in material and labor costs for the production of cable ducts in cavity lining floors.

The aim is achieved according to the invention in that the support device and wall comprises legs constructed as support plates with vertical support rod which exhibits a screwthread at least in the uppermost region, and a support profile arranged on these legs with a cantilevered profile tab on each side as a horizontal bearing surface for the edge of the blind shuttering or the double bottom respectively, a profile tab projecting vertically upwards and separating the double bottom and the cast-in mass, and a groove of square or rectangular cross-section open downwards having longitudinal groovings recessed continuously in both lateral faces, which groovings correspond to the screwthread of the support rods and are mutually vertically staggered by half the pitch of the screwthread, while the screwthread of the support rods is engaged in the longitudinal groovings of the groove.

The screwthread introduced into the longitudinal groovings now permits a simple adjustment of the height of the support profile, by rotating the engaged support rods slightly clockwise or counterclockwise.

According to a first variant the support rod is freely rotatable in the support plate, which exhibits a mandrel or a bushing. The rotation may be effected manually, or with a tool in the case of a difficult to move screw. Force application means are preferably provided for engagement by a tool, for example a hole or at least two parallel-oriented surfaces recessed in the case of a round support rod.

According to a second variant the support rod is connected rigidly to the support plate, preferably by spot welding. In order to adjust the height in this case, the entire support plate may be rotated, which can always be done manually due to the larger circumference and therefore longer lever arm.

Before the support rods are engaged into the longitudinal groovings of the support profile, a screwnut is conveniently fitted onto their screwthread. These screwnuts may be tightened after adjustment and the entire system thus stabilized.

The load-bearing flexible support foil described in WO-A1 No. 86/02120 is preferably used as a prefabricated blind shuttering. For standardized building heights between approximately 80 and 160 mm, these blind shutterings permit inside heights between 50 and 130 mm; the interval of the square depressions arranged in the form of a regular interval, which form the supports, is preferably 200 mm. The blind shutterings, which are laid in the form of plates or webs, have an edge which corresponds approximately to the interval of the depressions acting as supports. Thus the closure means can be trimmed neatly against the support profile and the remaining edge can be laid and optionally glued on the corresponding profile tabs of the support profile adjusted in height.

The slabs with good load capacity for the double bottom, which consist of the concrete, light concrete, a synthetic anhydrite sand mixture, metal or wood, are generally thinner than the hardening mass cast into the blind shutterings. The profile tab for the blind shutterings is therefore generally arranged lower than that for the double bottom.

The groove, constructed with a square cross-section or in the form of an erect rectangle, for the support rods which are at least partly provided with a turned screwthread, is preferably located under the profile tab serving as bearing surface for the double bottom. However, the tab in question continues beyond the groove.

For a simplified connection of two support profiles, a groove relieved in square or rectangular configuration is preferably constructed, likewise under the profile tab for the double bottom, and can receive a small plate for a plug-in connection.

In the case of cable ducts formed by two support devices and walls, the cables and lines rest upon the bare concrete floor. However, it is desired in specific cases of application to construct the cable ducts at least partly as so-called joint boxes. For this purpose, according to a preferred form of the invention, the ends of the support profile are miter cut in the direction of the profile tab for the double bottom, and two support profiles oriented in the longitudinal direction are combined with two support profiles oriented at right angles to them to form a joint box. This is effected by welding or screwing, for example, or with the aid of a corner angle plate introduced into the abovementioned relieved groove.

Such a joint box preferably exhibits transverse webs attached to the profile tab for the double bottom, which webs serve as a cable rest. Arrangement dividers in the form of longitudinal webs or vertical struts make it possible to divide the different types of cables and/or lines. The joint boxes are conveniently closed with a metallic cover approximately 5 mm thick, in which case this cover is covered by a carpet or, being of decorative construction, remains on the surface.

The extruded support profiles consist preferably of an aluminum pressed alloy of known composition. The support rods consist of steel. However, support profiles consisting of a hard plastic, polyethylene for example, which are produced by know injection-molding or pressing methods, may also be used. In this last case the support rods consist of steel or aluminum.

After the support devices and walls for a cable duct have been assembled and adjusted, the support legs are cast with a customary two-component adhesive, which forms a monolithic connection with the bare concrete floor.

Figure 2:
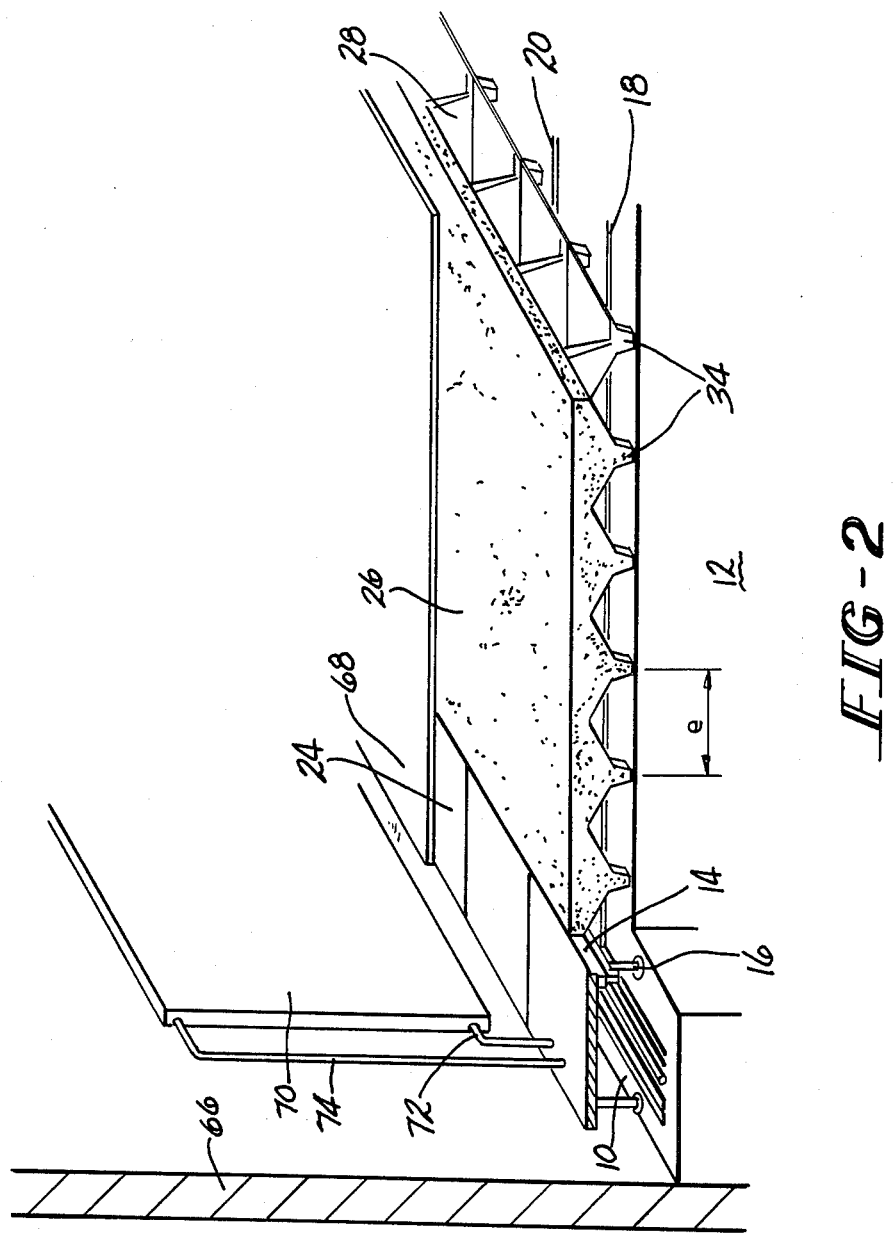
Figure 3:
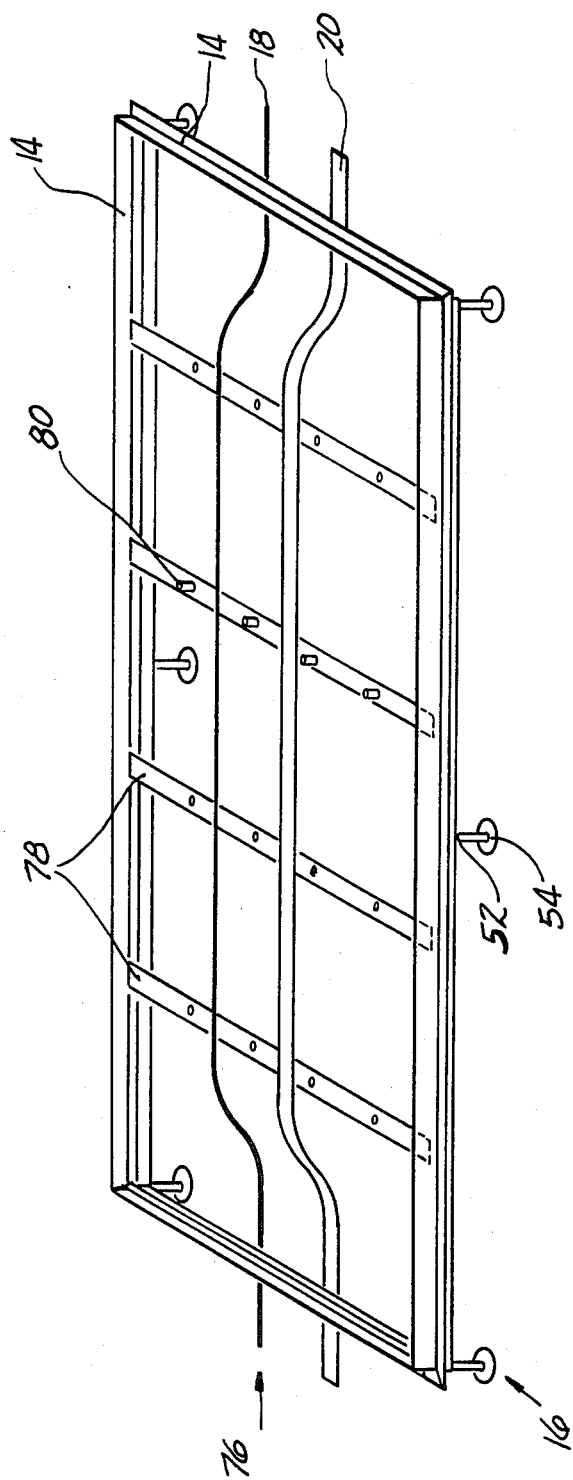

The invention will be explained more fully with reference to the examples of construction illustrated in the drawing, wherein, diagramatically:

FIG. 1 shows a vertical section oriented in the transverse direction through a cable duct in a cavity lining floor, FIG. 2 shows a fragmented perspective view of the transition from the floor to the wall with a cable duct running along this wall, and FIG. 3 shows a perspective view of a joint box for a cable duct.

The cable duct 10 in a cavity lining floor illustrated in FIG. 1 is 60 cm wide. The two support devices and walls oriented in the longitudinal direction of the duct consist substantially of a support profile 14 with legs 16 arranged at regular intervals in the longitudinal direction. All the main strings for cables 18 and other lines 20 are arranged directly on the bare concrete floor 12 in the cable duct 10.

The extruded aluminum profile 14 has a profile tab 20 projecting vertically upwards, which separates the double bottom 24, consisting of a light concrete slab, from the mass 26 cast-in in flowable condition. The latter is poured into a prefabricated blind shuttering 28 made of polyvinylchloride, which is braced by the trimmed edge 30 against a profile tab 32 cantilevered at right angles from the support profile 14 and rests by depressions 34 as supports upon the bare concrete floor 12.

A further profile tab 36 with a horizontal bearing surface, which supports the double bottom 24, is molded inwards relative to the cable duct 10. A groove 38 shown in square cross-section, which is arranged molded on the underside of this profile tab 36, receives a small connecting plate (not shown) at the joints of the support profiles 14. According to the variant on the left-hand side of FIG. 1, the groove 38 is formed by a cam 40 and an L-shaped molding 42, according to the variant on the right-hand side the groove 38 is recessed out of the profile tab 36.

The profile 14 has a downward groove 48 of rectangular cross-section arranged between two vertical members 44,46 two vertical members 44, 46, a groove 48 of rectangular cross-section. The two inner longitudinal sides of this groove 48 have extruded pressed longitudinal groovings 50, which are of triangular or trapezoidal cross-sectional construction, for example, depending upon the screwthread configuration of the support rod to be introduced. The longitudinal groovings 50 recessed out of the member 46 are staggered vertically relative to those of the member 44 by half the pitch of the screwthread of the support rod 52 to be introduced.

The support rod 52 of the legs 16 is introduced into the longitudinal groovings 50 and rests in turn upon a support plate 54. The support rod 52 is rotatable relative to the support plate 54 placed upon the bare concrete floor 12; according to the variant illustrated on the lefthand side it is guided by a mandrel 56, and according to the variant illustrated on the right-hand side by a bushing 58. The screwthread of the support rods 52 is comparatively difficult to move in the longitudinal groovings, and it is therefore advantageous to use a tool applied as a lever. The support rod 52 illustrated on the left-hand side exhibits a hexagonal guide means 60 recessed on the outer circumference for the engagement of a fork key, whereas the support rod 52 illustrated on the right-hand side exhibits a bore 62 for the introduction of a tommy bar. The height of the support profiles 14 can be adjusted infinitely and finely by rotating the support rod 52.

After adjustment the support rod 52 is checked with the support profile 14 by means of a locknut 64.

FIG. 2 shows a cable duct 10 routed along a wall 66. This duct is constructed substantially according to one of the variants illustrated in detail in FIG. 1 and has a width between 300 and 600 mm. The double bottom 24 consists of wooden boards which rest upon the profile tab 36 of the support profiles 14. The legs 16 can be adjusted in height manually by rotating the support plate connected rigidly to the support rod. The blind shuttering 28 has a regular distance in two directions of 200 mm side length. Corresponding to this distance, legs 16 for the support profiles are arranged every 600 mm and, viewed from in front, are located at the same room depth as the depressions 34 of the blind shutterings 28. The interval of 600 mm of the legs 16 corresponds to three times the interval e of the depressions 34.

Cables 18 and lines 20 forming the fine distribution branch off from the cable duct 10 and are routed between the depressions 34. The cables 18 lead to plug sockets (not shown) to which the flexible cables of electrical consumers are connected.

Both the lift-off double bottom 24 and the hardened mass 26 cast-in in the flowable state are covered with a carpet covering 68.

Lastly, FIG. 2 also shows a radiator 70, which is supplied with water through a feed pipe 72 and a return pipe 74. These pipes are also routed through the cable duct 10.

FIG. 3 shows, without the surrounding cavity lining floor for the sake of clarity, a joint box 76 which consists of four support profiles 14 according to FIG. 1 miter cut in the direction of the profile tab 36 for the double bottom and mutually connected by clamp elements or by welding, for example. The joint box has a length of 1800 mm and a width of 600 mm. The 5 mm thick load-bearing metal cover has been omitted in order to simplify the drawing.

The joint box 76 exhibits a leg 16 according to a variant of FIG. 1 in the region of each of the corners and in the center of the support profiles 14 oriented in the longitudinal direction, or else the support rod 52 may not be rotatable relative to the support plate 54, but connected rigidly to the latter by spot welding. The support rod is rotated in order to adjust the height.

A total of four transverse webs 78 rest upon the profile tab 36 intended for the double bottom and are attached mechanically to the latter. The transverse webs 78 are penetrated by arrangement dividers 80, in the present case bars screwed into a screwthreaded hole, which are shown only on one transverse web 78 for the sake of simplicity. These bars may carry a rubber cap and support the metal plate (not shown).

Plug-on profiles (not shown) may be inverted over the vertical profile tab of the support profiles 14 and serve as bearings for adjustable floor coverings.

Where a plurality of joint boxes 76 are arranged consecutively in the longitudinal direction, they have an interval of 100-150 mm, for example. Particularly in the case of decoratively conformed metal covers, this can be utilized to arrange a frieze running transversely to the joint box 76. Dark friezes with light parquet inlays appear to particular advantage.

The cables 18 and flexible lines 20 are routed under the support profile 14 arranged in the transverse direction over the first and the following transverse webs 78 and drawn through under the other support profile 14 oriented in the transverse direction to the next joint box 18. The cables 18 and/or lines 20 are routed through the joint box 76 separated by the arrangement dividers 80 according to functional and/or final criteria.

We claim:

1. A support device and wall for a cable duct (10) in a cavity lining floor, which device comprises a lift-off double bottom (24) in the direction of the cable duct (10) and a prefabricated blind shuttering (28) on the opposite side and exhibits legs (16) standing on the bare concrete floor (12) at regular intervals corresponding to an integral multiple of the interval (e) of adjacent depressions (34) in the blind shuttering (28), which legs are in alignment with the depressions (34) relative to the transverse direction of the cable duct (10), wherein the support device and wall comprises legs (16) constructed as support plates (54) with vertical support rod (52) which exhibits a screwthread at least in the uppermost region, and a support profile (14) arranged on these legs (16) with a cantilevered profile tab (32, 36) on each side as a horizontal bearing surface for the edge (30) of the blind shuttering (28) or the double bottom (24) respectively, a profile tab (32) projecting vertically upwards and separating the double bottom (24) and the cast-in mass (26), and a groove (48) of square or rectangular cross-section open downwards having longitudinal groovings (50) recessed continuously in both lateral faces, which groovings correspond to the screwthread of the support rods (52) and are mutually vertically staggered by half the pitch of the screwthread, whilst the screwthread of the support rods (52) is engaged in the longitudinal groovings (50) of the groove (48).

2. The support device and wall is claimed in claim 1, wherein the legs (16) exhibit a support rod (52) freely rotatable in or on the support plate (54), whilst means (60, 62) to apply a force by a tool are preferably provided.

3. The support device and wall as claimed in claim 1, wherein the legs (16) comprises a support rod (52) connected to the support plate (54) rigidly, preferably by spot welding.

4. The support device and wall as claimed in claim 1, wherein the support rods (52) are locked with a screwnut (64).

5. The support device and wall as claimed claim 1, wherein the profile tab (32) for the blind shuttering (28) is arranged lower than the profile tab (36) for the double bottom (24).

6. The support device and wall as claimed in claim 1, wherein the groove (48) for the longitudinal groovings (50) is arranged underneath the profile tab (36) for the double bottom (24).

7. The support device and wall as claimed in claim 1, wherein a groove (38) relieved in preferably square or rectangular configuration, which is constructed underneath the profile tab (36) for the double bottom (24), receives a small plate for a plug-in connection in the joint region of the support profiles (14).

8. The support device and wall as claimed in claim 1, wherein the ends of the support profile (14) are miter cut in the direction of the profile tab (36) for the double bottom (24), and two support profiles (14) oriented in the longitudinal direction are combined with two support profiles (14) oriented at right angles to the latter to form a joint box (76).

9. The support device and wall as claimed in in claim 8, wherein the joint box (76) exhibits transverse webs (78) attached to the profile tab (36) for the double bottom (24) as a cable bearing, which webs preferably have arrangement dividers (80), and is closed by a lift-off metal cover.

10. The support device and wall as claimed in claim 1, wherein the support profile (14) consists of an extruded aluminum alloy or of a pressed or injectionmolded hard plastic, and the support rods (52) consist of steel in the former case, and of steel or aluminum in the latter case.

* * * * *